US007832070B2

(12) United States Patent
Mordukhovich

(10) Patent No.: US 7,832,070 B2
(45) Date of Patent: Nov. 16, 2010

(54) APPARATUS AND METHOD FOR STRENGTHENING GEAR TEETH

(75) Inventor: Gregory Mordukhovich, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1140 days.

(21) Appl. No.: 11/462,165

(22) Filed: Aug. 3, 2006

(65) Prior Publication Data

US 2008/0032851 A1    Feb. 7, 2008

(51) Int. Cl.
*B24B 39/00* (2006.01)
*B21D 53/28* (2006.01)

(52) U.S. Cl. .......................... 29/90.6; 29/90.01; 29/893; 29/893.3; 29/893.35

(58) Field of Classification Search ................ 29/90.01, 29/90.6, 893, 893.3, 893.34, 893.35; 72/256, 72/257, 467; 475/344
See application file for complete search history.

(56) References Cited

U.S. PATENT DOCUMENTS

| | | | | | |
|---|---|---|---|---|---|
| 1,486,340 | A | * | 3/1924 | Hoke | 451/47 |
| 1,833,993 | A | * | 12/1931 | Hill | 409/51 |
| 1,881,382 | A | * | 10/1932 | Wildhaber | 451/47 |
| 2,228,967 | A | * | 1/1941 | Miller | 76/115 |
| 2,228,968 | A | * | 1/1941 | Miller | 407/27 |
| 2,986,856 | A | * | 6/1961 | Fehr | 451/47 |
| 3,782,040 | A | * | 1/1974 | Harle et al. | 451/47 |
| 3,803,977 | A | * | 4/1974 | Psenka et al. | 409/37 |
| 3,872,701 | A | * | 3/1975 | Tersch | 72/102 |
| 3,953,914 | A | * | 5/1976 | Huber et al. | 29/90.6 |
| 3,960,055 | A | * | 6/1976 | Psenka et al. | 409/49 |
| 4,305,190 | A | * | 12/1981 | Flair | 29/90.6 |
| 6,357,272 | B1 | * | 3/2002 | Sandner | 72/91 |
| 7,686,734 | B2 | * | 3/2010 | Mordukhovich et al. | 475/331 |

* cited by examiner

*Primary Examiner*—David P Bryant
*Assistant Examiner*—Ryan J Walters
(74) *Attorney, Agent, or Firm*—Quinn Law Group, PLLC

(57) ABSTRACT

An apparatus and method for increasing the operating life of a rotating gear element including a plurality of outwardly-projecting gear teeth each having an involute profile, with each gear tooth having a pair of flanks and a pair of generally semi-circular root portions. A ring tool having a plurality of hardened, inwardly-projecting burnishing teeth is employed to plastically deform only the root portions of the gear element being formed, while avoiding contact with the flanks as the gear element is passed through the ring tool. The ring tool also includes a plurality of broaching surfaces or cutting edges for removing excess stock material from the surfaces of the root portions. The ring tool increases the compressive residual stresses in the root portion of the gear element being formed, thereby creating an optimal residual stress profile and greater bending strength within the root portion of the gear element.

6 Claims, 2 Drawing Sheets

APPARATUS AND METHOD FOR STRENGTHENING GEAR TEETH

TECHNICAL FIELD

The present invention relates generally to an improved apparatus and method for isolated burnishing or plastically deforming the root portions only of external automotive transmission gear elements to thereby increase gear tooth bending strength.

BACKGROUND OF THE INVENTION

Gear sets or gear trains are common to mechanical and electro-mechanical systems requiring rotational motion and power transmission, and are therefore often utilized in systems ranging in complexity from a simple wrist watch or wind-up toy to advanced modern automotive transmissions. A gear set consists of two or more mechanical gear elements. Each gear element is engageable, meshable, or otherwise matable with at least one other gear element in the gear set for the purpose of transmitting power and motion between the various gear elements comprising the gear set. The specific gear element or series of elements chosen for any given application will largely depend upon the dynamics of the system into which the gear set is employed, as well as the respective forces or loads to which the individual gear elements that comprise the gear set are subjected.

Complex mechanical systems, for example automotive transmissions, commonly use a planetary gear set or sets comprised of any number of inter-meshed external gear elements such as sun gears or ring gears, and internal gear elements such as pinion gears, with the terms "external" and "internal" referring to the projecting direction of the gear teeth ringing the gear element. Each mating gear element within a planetary gear set of a transmission has a plurality of mating or meshing gear teeth, with each gear tooth typically having an involute surface profile. In an involute profile, contact between mating gear teeth is retained within a flat plane as the curved flanks of the gear teeth rotatably engage and disengage, thereby isolating all physical contact between the mating gear teeth to the active or contact surface portions of the gear flanks. Positioned between the mating gear teeth are non-contactable root portions each having a generally semi-circular profile. The semi-circular profiles of the root portions of involute gear teeth are, as part of the gear formation step, typically formed by milling or hobbing processes which cut or remove excess material from the metal gear blanks. While the involute design has many known inherent advantages, the rotational forces to which the involute gear elements are subjected are also known to place substantial tensile stress or bending force on the root portions of the gear tooth.

Therefore, it is advantageous to strengthen the gear element to prevent failure from the various stresses applied thereto. Strengthening typically takes the form of hardening by way of initial heat-treating of the entire gear element. Heat-treated gear elements are then commonly subjected to additional finishing steps applied to shape the surface asperity profile of the gear flanks in order to increase the overall micro-level hardness of the gear element. Two of the more common finishing steps are abrasive grinding and shot peening. With abrasive grinding, a grinding tool is used to mechanically shave or grind the entire profile of the gear tooth, including the exposed gear root portions. Complete shaving of the entire gear tooth profile is often considered necessary in order to avoid "steps" or unevenness along the continuous gear tooth surfaces. Common abrasive grinding techniques include diamond grinding and, more commonly, cubic born nitride or CBN grinding. With shot peening, also known as metal bead blasting, metal shot or small spheres are blasted or shot into the exposed gear surfaces to plastically deform the impacted surface layers to thereby introduce compressive residual stresses and increase the micro-hardness of the surfaces. However, because all of the exposed surfaces of the gear element are equally affected by the bombardment of metal shot, the asperity profile of the exposed flanks of the gear tooth may be altered beyond that which is desirable, and, as a result, the gear elements might have to be subjected to additional finishing steps such as polishing and/or glass-bead blasting.

SUMMARY OF THE INVENTION

Accordingly, an improved gear tooth strengthening method is provided for increasing the operating life of a gear element having a plurality of projecting gear teeth. The method includes heat-treating the gear element as a preliminary step, and then plastically deforming the surfaces of the exposed gear roots to a predetermined depth without also thereby plastically-deforming the exposed active surfaces of the gear flanks. In so hardening only the gear roots, the compressive residual stress of the gear root is increased without changing the profile of the gear flanks, resulting in improved overall bending strength of the gear tooth.

In one aspect of the invention, the root hardness of an external gear element is increased using an improved ring tool having a plurality of hardened, inwardly-projecting burnishing teeth that are matable with the gear tooth roots of an external gear element and are operable to impart a predetermined level of plastic deformation to the root surfaces without thereby touching the exposed gear flanks of the gear element when the gear element is passed through the ring tool.

In another aspect of the invention, the improved ring tool is constructed at least partially of carbide and further has a plurality of broaching surfaces for qualifying the size of the gear element being formed, with the gear element being selected from the external gear element group consisting of sun gear and pinion gear.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
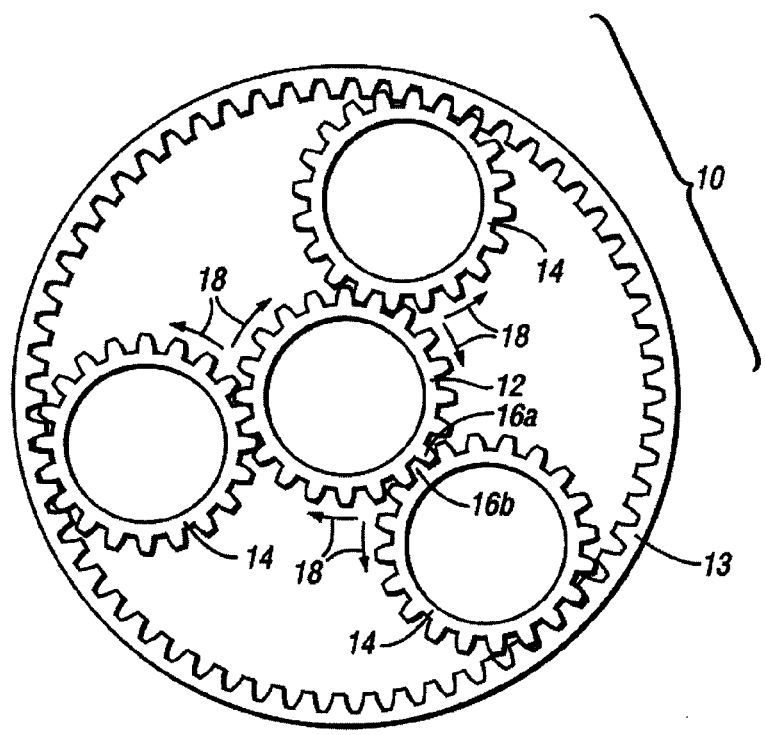
FIG. 1 is a schematic illustration of mating gear elements of a representative planetary gear set.

Referring to the drawings wherein like reference numbers correspond to like or similar components throughout the several figures, there is shown in FIG. 1 a gear set 10, shown here as a representative planetary gear set, consisting of a first external gear element 12, a first internal gear element 13, and a plurality of second external gear elements 14. Although depicted in FIG. 1 as a planetary gear set, gear set 10 may also take the form of, for example, a linear gear train or a more complex planetary gear set having a greater number of meshing gears. Meshing first and second external gear elements 12, 14 are shown in FIG. 1 as a representative sun gear and pinion gear, respectively, which will be used hereinafter for the purpose of explaining the invention. However, the invention would be equally suitable for any pair of mating gear elements within a gear set or gear train.

Figure 2:
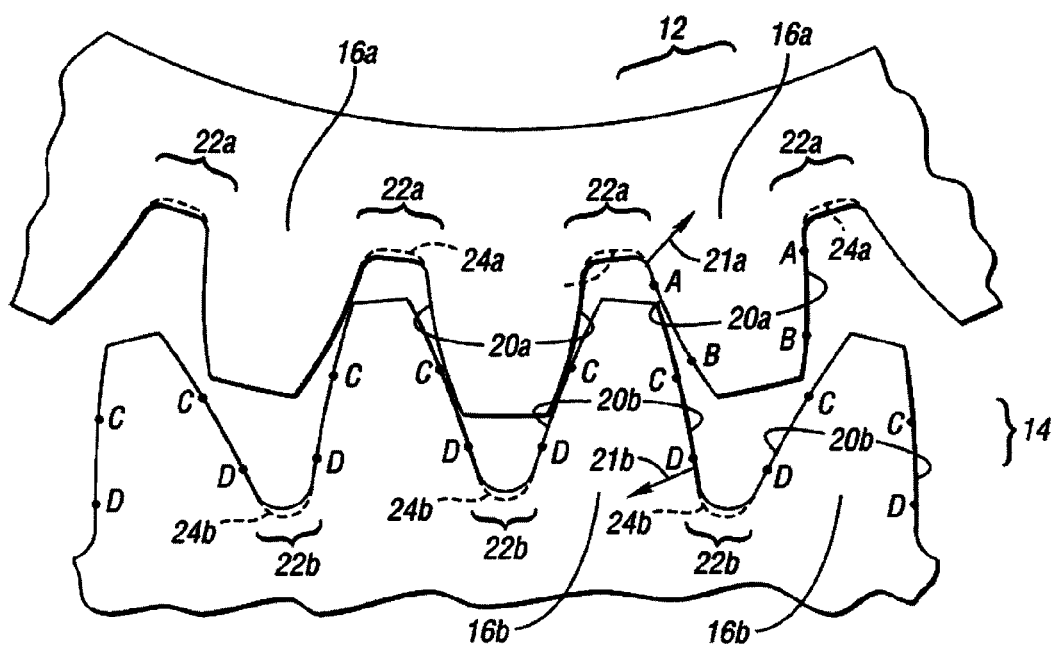
FIG. 2 is a fragmentary schematic illustration of a mating gear teeth each having an involute profile and root portions according to the invention.

As shown in FIGS. 1 and 2, first and second external gear elements 12, 14 have a plurality of gear teeth 16a, 16b, respectively, extending radially outward from the gear elements 12, 14. Gear teeth 16a, 16b are equally spaced around the outer perimeter of gear elements 12, 14. Gear element 12 has a plurality of gear teeth 16a that are mutually meshable or engageable with the plurality of identical meshable gear teeth 16b of mating gear element 14. Once so mutually engaged, gear teeth 16a, 16b then cooperate to transmit rotational motion, as represented by the various arrows 18 in FIG. 1. The profiles of gear teeth 16a, 16b are preferably the involute profile common to vehicle transmissions and other high-speed, high-stress systems. Such an involute profile is shown in greater detail in FIG. 2.

The plurality of gear teeth 16a of gear element 12 each have a pair of opposing active surfaces or flanks 20a, the flanks 20a encompassing the entire expanse of contact surfaces between the mating gears. These contact surfaces are represented in FIG. 2 approximately as the line or path AB. Likewise, identical gear teeth 16b each have a pair of flanks 20b opposable with the flanks 20a of gear teeth 16a, with the contact surfaces of flanks 20b described approximately by the line or path CD. Gear element 12 has a generally or substantially semi-circular root portion 22a having a plastically-deformable root surface 24a, shown as a dotted line, disposed between each of gear teeth 16a. Likewise, gear element 14 has a preferably identical generally or substantially semi-circular root portion 22b having a plastically-deformable root surface 24b, shown as a dotted line, disposed between each of the gear teeth 16b.

As mating gear teeth 16a, 16b come into direct dynamic contact and engage, revolve, and subsequently disengage through one complete rotational cycle, mutual opposing force is brought to bear on the active surfaces or flanks 20a, 20b of mating gear elements 12, 14, respectively. Bending fatigue may therefore appear below or radially inward of the flanks 20a, 20b of the respective root portions 22a, 22b due to the mutual opposing force or tensile stress exerted on the flanks 20a, 20b, as represented by arrows 21a, 21b of FIG. 2. Material failure or crack propagation could result approximately along the direction of arrows 21a, 21b unless roots 22a, 22b of gear elements 12, 14 are strong enough to resist the tensile stresses. In accordance with the invention, therefore, the life of gear set 10 is increased by hardening the root portions 22a, 22b to create a plastically-deformed root surface 24a, 24b to thereby increase the bending strength of gear teeth 16a, 16b, respectively, without also thereby contacting the flanks 20a, 20b, and/or altering the geometry of the flanks 20a, 20b.

Looking again to FIG. 2, gear elements 12, 14, have substantially semi-circular root portions 22a, 22b, respectively, each having a plastically-deformable root surface 24a, 24b, as previously described herein. The root portions 22a, 22b are typically milled or hobbed out of a gear blank during the initial gear manufacturing process, with the kinematics of the gear hobbing process alone typically determining the final geometry of the root portions 22a, 22b. By contrast, in accordance with the invention, geometry of the root portions 22a, 22b are determined by broaching and burnishing which isolates hardening to the root portions 22a, 22b of gear elements 12, 14.

Figure 3:
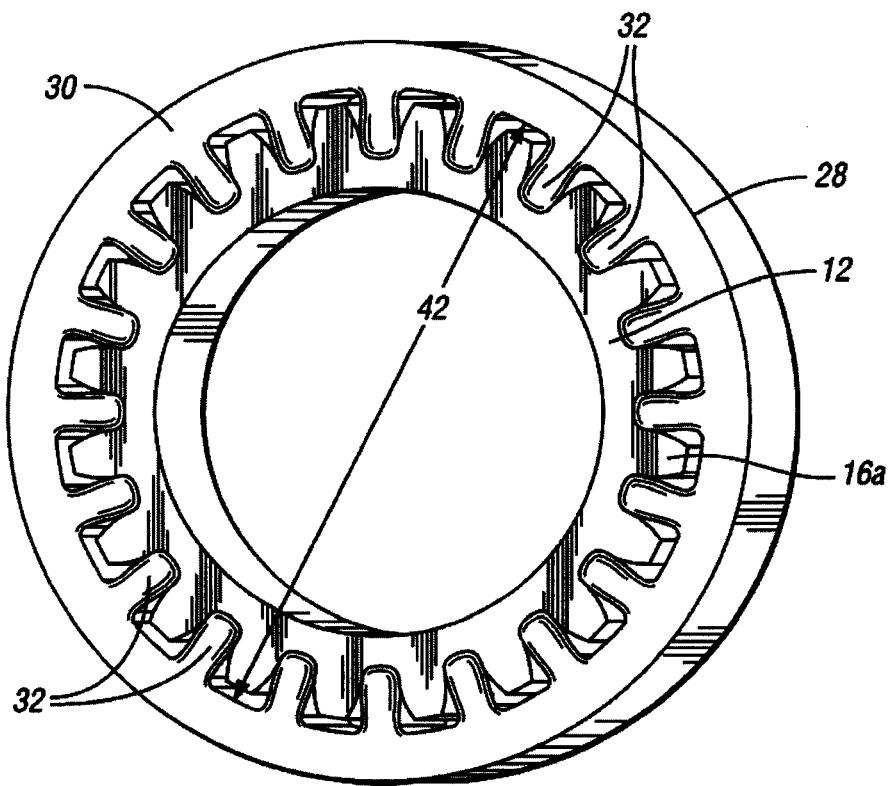
FIG. 3 is a schematic perspective illustration of an improved ring tool and mating gear element according to the invention.
Figure 4:
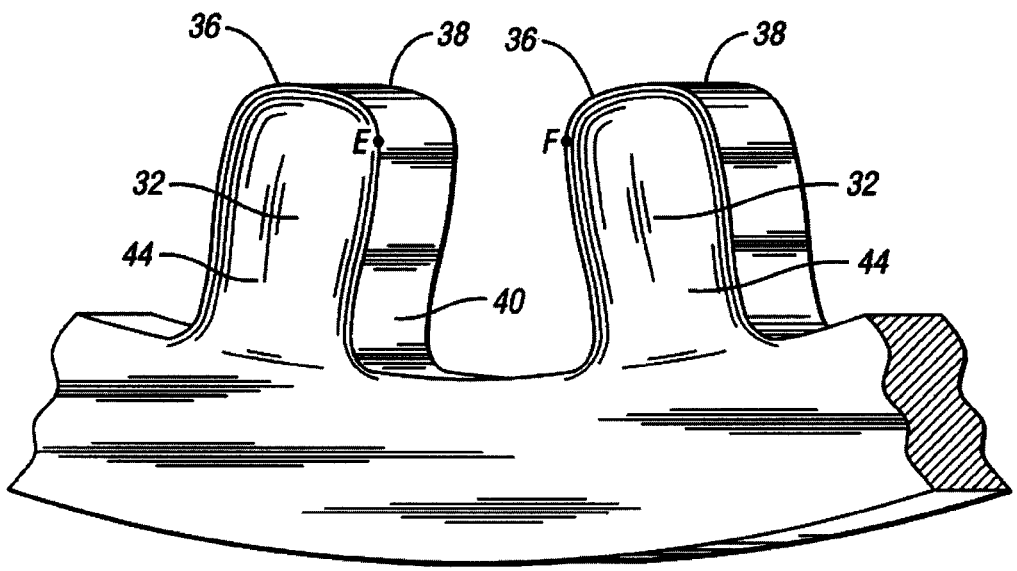
FIG. 4 is a fragmentary schematic illustration of a burnishing tooth portion of the improved ring tool.

To isolate hardening to the root portions 22a, 22b, an improved forming tool or ring tool 30 is provided as shown in FIGS. 3 and 4. Ring tool 30 preferably has a circular perimeter 28 and a plurality of radially-inwardly projecting burnishing teeth 32. Referring to FIG. 4, each burnishing tooth 32 has an identical, generally semi-circular and substantially convex hardened forming surface 38 configured to plastically-deform the opposing root portions 22a, 22b (FIG. 2) and to broach or cut any excess material from the surfaces of mating root portions 22a, 22b. Plastic deformation is provided generally by forming or coating the plurality of burnishing teeth 32 from or with material having a suitably elevated surface hardness relative to the surface hardness of the root portions 22a, 22b of the gear element being formed. Broaching is provided generally by forming a cutting surface or broaching edge 36 (see FIG. 4) along the entirety of the forming surface 38 of burnishing teeth 32.

More specifically, the broaching capability of the invention is provided by a projecting or protruding broaching edge 36 as shown in FIG. 4, the broaching edge 36 spanning approximately the entire span of generally or substantially semicircular burnishing edge 38 and being configured to remove excess stock material from the gear element being formed. Preferably, the broaching edge 36 of each of burnishing teeth 32 is provided by way of a slightly concave face 44 ringed or surrounded by a suitably sharp cutting surface, as shown in FIG. 4. Removal of excess material is accomplished as the broaching edge 36 cuts, shaves, or broaches material in excess of the center diameter 42 of the ring tool 30 as the gear element being formed passes through the ring tool 30, as with representative gear element 12 in FIG. 3. Broaching of excess gear element material, specifically excess material around the root portions 22a is necessary in order to prevent damage to the ring tool 30 and/or gear element 12, due to the presence of excessive material in and around the root portions 22a. Excessive material may be present in the root portions of the gear elements being formed such as 22a, 22b of gear elements 12, 14 due to the larger tolerances used in the formation of the root portions 22a, 22b during manufacturing of the gear blank (not shown), or the material may be left behind after the initial hobbing process used to form the root portions 22a, 22b. Also, heat applied during initial hardening heat treatment may expand and distort the gear blank after formation, increasing the geometry of the gear element until the geometry is no longer within tolerance. Because damage may occur to either or both the gear element and ring tool 30 as the larger than desirable gear element being formed is forced through the ring tool 30, broaching surfaces 36 operable to cut or broach the excess material and thereby prevent such damage are provided in accordance with the invention.

Ring tool 30 also provides a burnishing capability and therefore is appropriately sized and shaped to impart to the gear element to be formed the desired depth of plastic deformation. In FIG. 3, gear element 12 is used as an exemplary or representative gear, although one skilled in the art will recognize that gear element 14 or another external gear element may likewise be used as explained hereinafter. An external gear such as gear element 12 is passable under an external force appropriate for providing a predetermined level of plastic deformation to the root surfaces 24a of contacted root portions 22a. The plastically-deformed layers 24a of root portions 22a of gear teeth 16a, as well as the plastically-deformed layers 24b of root portions 22b of gear teeth 16b, are shown as dotted lines in FIG. 2. As ring tool 30 performs as a forming tool, those skilled in the art of tool making would recognize various methods for holding ring tool 30 stationary with respect to the gear element being formed. For instance, ring tool 30 may be secured within a manual fixture or within a fixture-portion of a piece of capital equipment such as a press, while the gear element, such as gear element 12 of FIG. 3, is moved through the ring tool 30 under a force suitable to impart the desired level of plastic deformation to the root surface 24a.

Variables that will affect the final depth of the plastically-deformable root surfaces 24a, 24b and the geometry of root portions 22a, 22b include both the relative hardness and the geometrical variance and/or tolerance between the mating ring tool 30 and the gear element being formed. Ideally, the gear element being formed is heat-treated prior to burnishing to prevent the loss of the residual stress benefits of burnishing due to martensitic transformation. Likewise, the amount of force used to move the gear element through the ring tool 30 is a function of the desired predetermined level of broaching and/or burnishing, and may be manipulated to produce the desired surface hardness on the root surface such as 24a of gear element 12. As stated earlier herewithin, to ensure proper hardening of the root surfaces such as 24a, the ring tool 30, and in particular the plurality of burnishing teeth 32, are formed of a material having sufficiently greater surface hardness than that of the gear element being hardened, so as to adequately plastically deform the root surface 24a, 24b as a result of mutual, forceful contact between the ring tool 30 and the gear element.

Preferably, at least the forming surface 38 portion of burnishing tooth 32 is constructed using carbide or a suitable high-speed tool steel having Rockwell C hardness ($R_c$) of at least approximately 5-10 $R_c$ greater than that of the gear element being formed. As representative external gear elements 12, 14 are preferably constructed of 5120 steel or other suitable material having a hardness of approximately 55-65 $R_c$, the preferred hardness of the mating burnishing teeth 32 is approximately 60-75 $R_c$, although harder burnishing teeth may also be provided using specialized 75 $R_c$ or harder grades of carbide. Non-forming surface 40 of burnishing tooth 32, describing the expanse of gear tooth surface not including forming surface 38 and represented approximately by the line traced along the curve of the burnishing tooth 32 between points E and F in FIG. 4, does not make contact with any surface of the gear element being formed during the broaching or burnishing process. Therefore, hardening of non-forming surfaces 40 is not essential, although equal hardening of all material surfaces of ring tool 30 is desirable in order to ensure the overall structural integrity of the ring tool 30.

The size of ring tool 30 and the number, shape, and size of burnishing teeth 32 are dependent on the design of the gear element to be formed. That is, as ring tool 30 is a tool or mold through which a formed and heat-treated gear element such as 12 is passed, the geometry of ring tool 30 is configured to match the geometry of the gear element 12 to be hardened. For example, as shown in FIG. 3, if gear element 12 were to have twenty separate gear teeth 16a, a ring tool 30 having twenty separate opposing burnishing teeth 32 would be required, with ring tool 30 being appropriately sized to allow a pre-selected mating gear element 12 to pass through ring tool 30 under the required force necessary to affect the desired changes to the root portion 22a.

As previously discussed herewithin, mating rotating gear elements such as gear elements 12, 14 create mutual tensile stress which may then manifest itself as bending fatigue radiating outward from root portions 22a, 22b, respectively. Each of gear elements 12, 14 possesses a predetermined material strength. If the tensile stress imparted to the gear tooth 16a, 16b exceeds such material strength, one or both of the gear elements 12, 14 will fail in the form of crack initiation, which may then propragate with the continued application of tensile stress. By adding compressive residual stress to the root portions 22a, 22b of representative gear elements 12, 14, the strength of material of the gear elements is thereby increased, with the object of increasing the strength of material to a level above that of the tensile stress imparted on the mating gear elements 12, 14. The use of ring tool 30 as herein described produces the required compressive residual stress in the form of plastic deformation of the root surfaces such as 24a of a gear element such as sun gear 12 after the gear element 12 has passed through the improved ring tool 30.

Those skilled in the art will recognize that excessive plastic deformation may damage the gear element, while insufficient plastic deformation will not produce compressive residual stress levels sufficient to elevate the strength of material of the gear element enough to prevent damage from bending fatigue. To strike the desired balance, the preferred depth of plastic deformation of plastically-deformable root surfaces 24a, 24b in accordance with the invention is approximately 2 to 5 micrometers (μ). To impart such a level of deformation, the profile of gear elements 12, 14 after qualifying broaching are approximately 2 to 5μ larger than the profile of the ring tool 30. In this manner, passing the softer gear element through the harder ring tool 30 will result in the desired 2 to 5μ deformation of the root portions 22a, 22b.

While the invention has been described previously herewithin in relation to an external gear element, those skilled in the art will recognize that the invention is equally applicable to internal gear elements such as ring gear 13 of FIG. 1 by reversing the orientation of burnishing teeth 32 of ring tool 30, that is, by so configuring outwardly-projecting burnishing teeth 32 to burnish only the root portions of the teeth of the ring gear 13.

While the best modes for carrying out the invention have been described in detail, those familiar with the art to which this invention relates will recognize various alternative designs and embodiments for practicing the invention within the scope of the appended claims.

The invention claimed is:

1. An apparatus, in combination: comprising:
a gear element having a plurality of outwardly projecting gear teeth, wherein each of said gear teeth has a pair of root portions each with a plastically-deformable root surface and a pair of gear flanks; and
a ring tool having a plurality of inwardly-projecting burnishing teeth, wherein said plurality of burnishing teeth mate with respective ones of the root portions of the gear element, and add compressive stress to the root portions to thereby plastically-deform only the respective root surfaces to a predetermined depth without contacting said gear flanks.

2. The apparatus of claim 1, wherein said gear teeth have an involute profile, and wherein said root portions have a generally circular profile.

3. The apparatus of claim 1, wherein said burnishing teeth have a hardness of approximately 5 to 10 Rc greater than that of said root portion.

4. The apparatus of claim 1, wherein said burnishing teeth are constructed at least partially of carbide.

5. The apparatus of claim 1, wherein said gear element is selected from the group of external gears consisting of sun gear and pinion gear.

6. The apparatus of claim 1, wherein said predetermined depth is approximately 2 to 5 micrometers.

* * * * *